Nov. 12, 1968  W. D. LUDWIG  3,410,309
FOUR-WAY VALVE
Filed Nov. 30, 1966
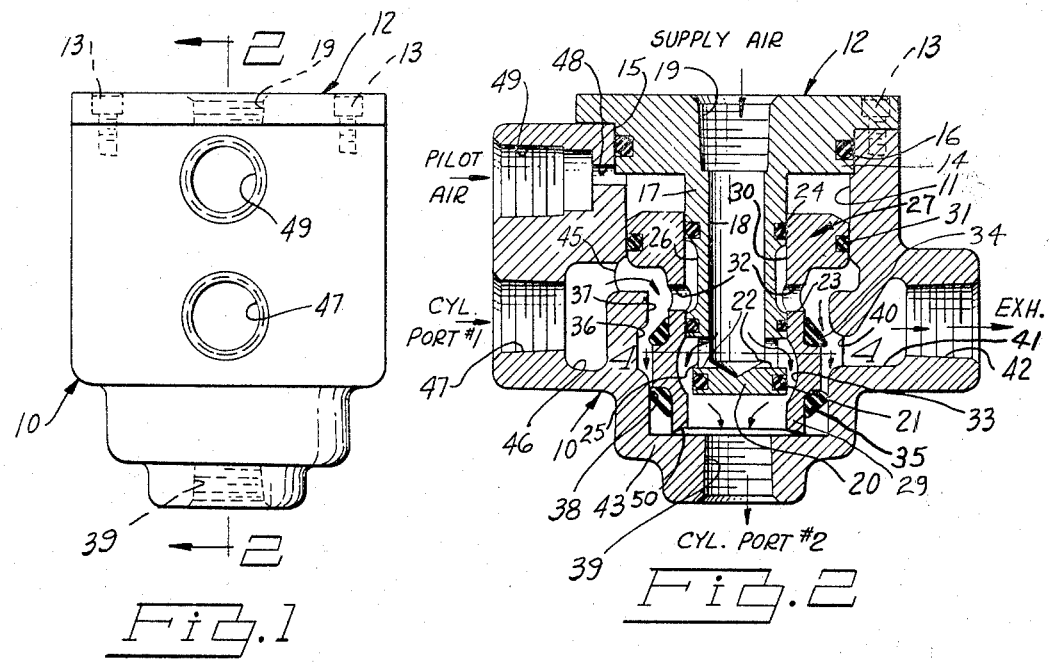
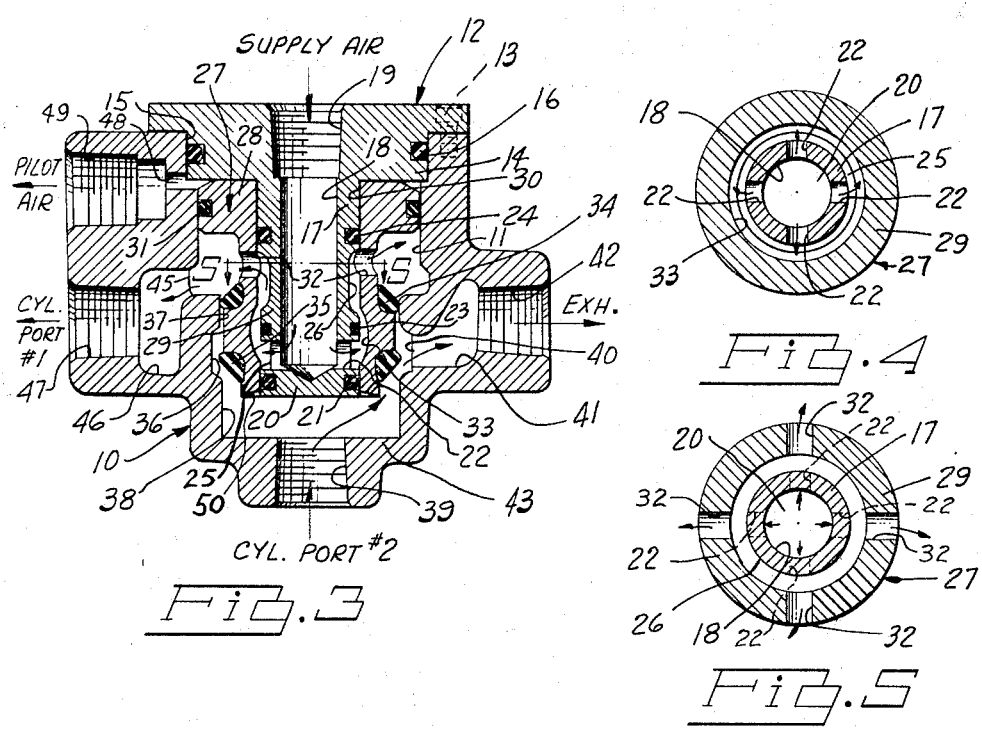
INVENTOR.
WALTER D. LUDWIG
BY Donnelly, Mentag & Harrington
ATTORNEYS United States Patent Office 3,410,309
Patented Nov. 12, 1968

3,410,309
FOUR-WAY VALVE
Walter D. Ludwig, Bloomfield Township, Oakland County, Mich., assignor to Mac Valves, Inc., Oak Park, Mich., a corporation of Michigan
Filed Nov. 30, 1966, Ser. No. 598,102
11 Claims. (Cl. 137—625.66)

ABSTRACT OF THE DISCLOSURE

A four-way reversing valve including a pair of annularly formed valve members that are concentrically disposed relative to a pressurized fluid supply chamber and which are movable relative to the outlet passage of a supply chamber for alternately directing fluid under pressure from the supply chamber to one of two transfer chambers, and simultaneously exhausting the other of the transfer chambers. The pair of valve members are concentrically mounted on a carrier member which is air piloted beyond two positions for carrying out the aforedescribed transfer action.

---

This invention relates generally to improvements in direction control valves for controlling the flow of pressurized fluid, such as air and the like, and, more particularly, to a pilot operated four-way reversing valve.

The use of air power for operating machine tools has increased greatly in recent years. Four-way valves to operate double acting cylinders satisfy the majority of applications in this industry. The valves in current usage fall generally into two categories, the poppet type and the spool type. These valves for different reasons assume a bulkiness out of proportion to their internal capacity. The poppet type valve is bulky because of the necessity of providing means to counterbalance or minimize the force to unseat the poppet, such as incorporating a piston or utilization of some form of mechanical leverage. The spool type valve which balances internal forces by nature of its design tends to grow in length to provide the necessary porting and internal passages. Achieving a minimal physical size with maximum internal capacity becomes increasingly important on more sophisticated circuitry wherein twenty or more valves are required on a single machine. Accordingly, in view of the foregoing, it is an important object of the present invention to provide a novel and improved four-way reversing valve which overcomes the aforementioned disadvantages of poppet and spool valves, yet which provides the advantages of both of these valves.

It is another object of the present invention to provide a four-way reversing valve which is capable of quickly supplying and exhausting large volumes of pressurized fluid, such as air and the like, to and from an apparatus to be controlled, such as the clutch of a press, an air cylinder, an air brake, or the like.

It is a further object of the present invention to provide a novel and improved four-way reversing valve for controlling the flow of fluid under pressure which has a large fluid handling capacity, which is rapid in actuation, and which provides maximum flexibility of porting arrangements.

It is still another object of the present invention to provide a novel and improved four-way reversing valve which is simple and compact in construction, economical to manufacture, and fast and efficient in operation.

It is still a further object of the present invention to provide a novel and improved four-way reversing valve for controlling the flow of fluid in a fluid supply system and which incorporates a movable, piloted valve carrier member that carries a pair of parallelly disposed valve means for quickly and efficiently reversing the flow of a pressurized fluid to an apparatus when the valve carrier member is moved a short distance between two operating positions.

It is still another object of the present invention to provide a novel and improved four-way reversing valve which embodies a pair of annularly formed valve means that are concentrically disposed relative to a pressurized fluid supply chamber and movable relative to the outlet passage means of the supply chamber for alternately directing fluid under pressure from the supply chamber to one of two transfer chambers and simultaneously exhausting the other of the supply chambers in a rapid reversing action.

It is still a further object to provide a novel and improved four-way reversing valve comprising a valve body having a first transfer chamber and a second transfer chamber; a first delivery port in said valve body communicating with said first transfer chamber, and a second delivery port in said valve body communicating with said second transfer chamber; a supply chamber on said valve body having inlet passage means communicable alternately with said transfer chambers; a supply port for admitting fluid under pressure to said supply chamber; an outlet passage in said valve body communicable alternately with said transfer chambers for exhausting fluid therefrom; an exhaust port in said valve body communicating said outlet passage with the exterior of the valve body; a carrier member movably mounted in said valve body between said inlet passage means and said outlet passage, said carrier member being movable between a first position and a second position; a first valve means on one side of said carrier member for controlling the flow of fluid through said inlet passage means; and, a second valve means on another side of said carrier member in a position parallel with said first valve means for controlling the flow of fluid through said outlet passage, whereby, when said carrier member is moved to said first position said first valve means will connect said inlet passage means with said first transfer chamber and said second valve means will connect said second transfer chamber with said outlet passage, and, when said carrier member is moved to said second position said first valve means will connect said inlet passage means with said second transfer chamber, and said second valve means will connect said first transfer chamber with said outlet passage.

It is still another object of the present invention to provide a novel and improved four-way reversing valve which embodies a pair of concentric valve means mounted on a carrier member which is air piloted between two positions for alternately directing fluid under pressure from a supply chamber to one of two transfer chambers and simultaneously exhausting the other of the transfer chambers.

It is apparent that other means than fluid pressure may be used to operate the valve described, and other objects, features and advantages of this invention will be apparent from the following detailed description, appended claims, and the accompanying drawing.

In the drawing:

FIG. 1 is a side elevational view of an illustrative embodiment made in accordance with the principles of the present invention;

FIG. 2 is an elevational section view of the valve structure illustrated in FIG. 1, taken along the line 2—2 thereof, looking in the direction of the arrows, and showing the valve in an energized position;

FIG. 3 is an elevational section view, identical to FIG. 2, of the valve structure illustrated in FIG. 1, but showing the valve in a de-energized position;

FIG. 4 is a fragmentary, horizontal section view of the valve structure illustrated in FIG. 2, taken along the line 4—4 thereof, and looking in the direction of the arrows; and, FIG. 5 is a fragmentary, horizontal section view of the valve structure illustrated in FIG. 3, taken along the line 5—5 thereof, and looking in the direction of the arrows.

Referring now to the drawing, and in particular to FIG. 2, the numeral 10 generally designates a valve body which is substantially cylindrical in overall configuration, and in one end of which is formed a cylindrical chamber 11 that functions as a first transfer chamber in the inner portion thereof and as an air pilot chamber in the outer portion thereof. As viewed in FIG. 2, the outer end of the air pilot portion of chamber 11 is enclosed by a detachable cover generally indicated by the numeral 12. The cover 12 includes a plate that is secured to the valve body 10, by any suitable means, as by a plurality of screws 13. The cover 12 includes an integral, reduced cylindrical extension 14 which is slidably seated in the outer, enlarged portion 15 of the chamber 11. The cover extension 14 is provided with a suitable annular seal means 16, as an O-ring seal.

As shown in FIGS. 2 and 3, an inserted supply member in the form of a cylindrical stem or shaft 17 is integral with the cover extension 14, and it extends axially into the chamber 11. An axial bore or supply chamber 18 is formed through the stem 17 and it communicates at its outer end with a supply port 19 adapted to be connected to a suitable source of pressurized air or other fluid. The inner end of the supply chamber 18 is enclosed by the end wall 20. An annular seal means 21, such as an O-ring seal, is operatively disposed around the periphery of the end wall 20.

As shown in FIGS. 2 and 4, the supply chamber 18 is provided with an inlet passage means comprising a plurality of radially disposed ports or passages 22 and a communicating, exterior annular groove 25 formed about the periphery of the inner end of the stem 17. As shown in FIGS. 2 and 3, the stem 17 is provided with a seal means 23, such as an O-ring seal, about the periphery thereof and adjacent the inner periphery of the annular groove 25. The seals 21 and 23 provide the annular groove 25 with sealing means about the inner and outer edges thereof. The stem 17 is provided with the further annular seal means 24, such as an O-ring seal, in a position spaced outwardly along the stem from the seal means 23. Formed between the seal means 23 and 24 is an annular, longitudinally extended peripheral groove or recess 26.

As shown in FIGS. 2 and 3, a sleeve member or carrier member, generally indicated by the numeral 27, is slidably mounted around the stem 17. The carrier member 27 includes a piston 28 on the outer end thereof which is slidably mounted in the chamber 11. The piston 28 is provided with a suitable annular seal means 31, such as an O-ring seal, about the periphery thereof. The carrier member 27 further includes a sleeve or cylindrical portion 29 which extends into the valve body 10 and surrounds the stem 17 when the valve is in the de-energized position shown in FIG. 3. The numeral 30 indicates the bore formed through the outer end or piston 28 of the carrier member 27 in which is slidably received the stem 17.

As shown in FIGS. 2 and 3, the inner end or portion of the chamber 11 comprises a first transfer chamber and it communicates with the annular recess 26 formed around the stem 17 by means of a plurality of ports or passageways 32 formed through the cylindrical body portion 29 of the carrier member 27.

As shown in FIGS. 2 and 3, an annular valve means, or first valve means, is formed on the inside of the carrier member 27, at the inner end thereof. Said first valve means is formed by the circular groove or recess 33 formed on the inside of the carrier member portion 29 and the cylindrical surfaces of the bore 30 on each side of the groove or recess 33 which are adapted to slidably engage the seal means 21 and 23 on the sides of the inlet passage means openings 25 to provide a valving action.

When the carrier member 27 is in the de-energized position of FIG. 3 the supply chamber 18 is in communication with the inner end, or first transfer chamber portion of the chamber 11.

As shown in FIGS. 2 and 3, the inner end of the sleeve member or carrier member 27 is provided with a pair of annular seal members 34 and 35 which are spaced apart longitudinally on the outer side of the carrier member portion 29. The working faces or sealing surfaces of the seal members 34 and 35 are disposed parallel to the axis of the carrier 27 and the working faces or sealing surfaces of the first valve means formed on the inside of the carrier member portion 29. The seal members 34 and 35 function to provide a second valve means on the exterior of the carrier 27. The aforementioned first valve means and second valve means are disposed concentrically with the supply chamber 18.

As shown in FIGS. 2 and 3, the chamber 11 communicates through a bore 37 with a second transfer chamber 38. The second transfer chamber 38 is cylindrical and is of the same size as the bore 37 and the peripheral surface of the chamber 38 adjacent the bore 37, and the peripheral surface of the bore 37 adjacent the chamber 38 forms a valve seat in conjunction with the intermediate annular recess 36. It will be seen that the aforementioned first and second transfer chambers are aligned with each other and are spaced by the last mentioned valve seat. The seal means 34 and 35 are adapted to slidably engage the surface of the bore 37 and the surface of the second transfer chamber 38. The second transfer chamber 38 communicates with the delivery port 39 which is formed in the second transfer chamber end wall 43. The delivery port 39 would be connected to an apparatus to be supplied with fluid under pressure, as for example, a number two port of a fluid cylinder.

As shown in FIGS. 2 and 3, the valve seat recess 36 communicates with the port 40 which is connected to the exhaust passage 41 that communicates with the exhaust port 42. The exhaust passage 41, port 40 and annular recess 36 form an outlet passage for exhausting fluid from the valve.

As shown in FIGS. 2 and 3, the first transfer chamber or inner end of the chamber 11 is connected to a delivery port 47 through the port 45 and the passageway 46. The port 47 would be connected to a port in an apparatus to be supplied with fluid under pressure, as for example, a number one port in a fluid cylinder.

As shown in FIGS. 2 and 3, the outer end of the chamber 11 forms an air pilot piston cylinder that is connected to a suitable source of pilot air under pressure by the passage 48 and the pilot air port 49.

In use, the delivery ports 39 and 47 are connected to an apparatus to be supplied with fluid under pressure and the pilot air port 49 is connected to a suitable source of pilot air under pressure. Assuming that the carrier member 27 is in the de-energized position shown in FIG. 3, the supply chamber 18 will supply fluid under pressure to the delivery port 47 and the delivery port 39 would be exhausted to the exhaust port 42. When the pilot air is admitted into the outer end of the chamber 11, the carrier member 27 will be moved to the energized position shown in FIG. 2 and the flow of fluid through the delivery ports will be reversed. That is, fluid under pressure will be supplied from the supply chamber 18 to the delivery port 39 and the delivery 47 will be exhausted through the port 42. When the pilot air is cut off, the differential in fluid pressures in the valve will engage the inner side of the piston 28 and return it to the de-energized position shown in FIG. 3. The inner end of the sleeve body 29 is relieved or chamfered on the inner side thereof, as indicated by the numeral 50, to permit the air under pressure in the valve to also engage the end 50 and assist in the return action of the carrier to the position shown in FIG. 3.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a valve construction of the class described, the combination comprising:
   (a) a valve body having a first transfer chamber and a second transfer chamber;
   (b) a first delivery port in said valve body communicating with said first transfer chamber, and a second delivery port in said valve body communicating with said second transfer chamber;
   (c) a supply chamber carried by the valve body and having inlet passage means communicable alternately with said transfer chambers;
   (d) a supply port for admitting fluid under pressure to said supply chamber;
   (e) an outlet passage in said valve body communicable alternately with said transfer chambers for exhausting fluid therefrom;
   (f) an exhaust port in said valve body communicating said outlet passage with the exterior of the valve body;
   (g) a carrier member movably mounted in said valve body between said inlet passage means and said outlet passage, said carrier member being movable between a first position and a second position;
   (h) a first valve means on one side of said carrier member for controlling the flow of fluid through said inlet passage means;
   (i) a second valve means on another side of said carrier member in a position parallel with said first valve means for controlling the flow of fluid through said outlet passage, whereby, when said carrier member is moved to said first position said first valve means will connect said inlet passage means with said first transfer chamber and said second valve means will connect said second transfer chamber with said outlet passage, and when said carrier member is moved to said second position said first valve means will connect said inlet passage means with said second transfer chamber, and said second valve means will connect said first transfer chamber with said outlet passage;
   (j) said carrier member comprising a sleeve member;
   (k) said first valve means being carried on the inside of said sleeve member; and,
   (l) said second valve means being carried on the outside of said sleeve member.

2. A valve construction as defined in claim 1, wherein:
   (a) said first and second valve means are annularly formed; and,
   (b) said supply chamber and first valve means are concentrically disposed relative to said second valve means.

3. In a valve construction of the class described, the combination comprising:
   (a) a valve body having a first transfer chamber and a second transfer chamber spaced apart from said first transfer chamber;
   (b) a first delivery port in said valve body communicating with said first transfer chamber, and a second delivery port in said valve body communicating with said second transfer chamber;
   (c) a supply chamber carried by the valve body and having inlet passage means that has an opening disposed between said transfer chambers and communicable alternately with said transfer chambers;
   (d) a supply port for admitting fluid under pressure to said supply chamber;
   (e) an outlet passage in said valve body communicable alternately with said transfer chambers for exhausting fluid therefrom and which has an opening disposed between said transfer chambers;
   (f) an exhaust port in said valve body communicating said outlet passage with the exterior of the valve body;
   (g) a sleeve member movably mounted in said valve body between said inlet passage means opening and said outlet passage opening, said sleeve member being movable between a first position and a second position;
   (h) a first valve means on the inside of said sleeve member for controlling the flow of fluid through said inlet passage means opening; and,
   (i) a second valve means on the outside of said sleeve member is a position parallel with said first valve means for controlling the flow of fluid through said outlet passage opening, whereby, when said sleeve member is moved to said first position said first valve means will connect said inlet passage means opening with said first transfer chamber and said second valve means will connect said second transfer chamber with said outlet passage opening, and, when said sleeve member is moved to said second position said first valve means will connect said inlet passage means opening with said second transfer chamber, and said second valve means will connect said first transfer chamber with said outlet passage opening.

4. A valve construction as defined in claim 3, including:
   (a) a piston member on said sleeve member; and,
   (b) means for supplying pilot air to said piston for moving said sleeve member between said first and second positions.

5. A valve construction as defined in claim 3, wherein:
   (a) said first valve means and said second valve means are concentrically disposed relative to said inlet passage means opening.

6. A valve construction as defined in claim 5, wherein:
   (a) said inlet passage means opening is provided with seal means disposed thereabout; and,
   (b) said first valve means comprises an annular valve seat operatively engageable with the seal means about said inlet passage means opening.

7. A valve construction as defined in claim 5, wherein:
   (a) said outlet passage opening is provided with an annular valve seat; and,
   (b) said second valve means comprises an annular seal means operatively engageable with said outlet passage opening valve seat.

8. A valve construction as defined in claim 3, including:
   (a) means for moving said carrier member between said first and second positions.

9. A valve construction as defined in claim 3, wherein:
   (a) said supply chamber comprises an inserted supply member in said valve body and said supply port is in said inserted supply member.

10. A valve construction as defined in claim 9, wherein:
    (a) said carrier member is movably mounted on said inserted supply member.

11. A valve construction as defined in claim 10, wherein:
    (a) said inserted supply member includes a cylindrical stem; and,
    (b) said carrier member comprises a sleeve member slidably mounted on said cylindrical stem.

References Cited

UNITED STATES PATENTS

| | | | |
|---|---|---|---|
| 2,634,751 | 4/1953 | Borer | 137—625.43 X |
| 2,969,091 | 1/1961 | Wolff | 137—625.43 |
| 3,181,567 | 5/1965 | Deutsch et al. | 137—625.43 |
| 3,238,972 | 3/1966 | Bowman | 137—625.66 X |

ARNOLD ROSENTHAL, *Primary Examiner.*